(12) United States Patent
Quach et al.

(10) Patent No.: US 7,970,954 B2
(45) Date of Patent: Jun. 28, 2011

(54) SYSTEM AND METHOD OF PROVIDING A USER-FRIENDLY DEVICE PATH

(75) Inventors: Natalie Quach, Austin, TX (US); Samer El Haj Mahmoud, Austin, TX (US); Anand P. Joshi, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 150 days.

(21) Appl. No.: 12/535,532

(22) Filed: Aug. 4, 2009

(65) Prior Publication Data
US 2011/0035515 A1 Feb. 10, 2011

(51) Int. Cl.
G06F 17/30 (2006.01)

(52) U.S. Cl. .............................. 710/2; 710/62
(58) Field of Classification Search .................. None
See application file for complete search history.

(56) References Cited

U.S. PATENT DOCUMENTS

| 6,851,065 B2 | 2/2005 | Lo et al. | |
|---|---|---|---|
| 7,281,169 B2 | 10/2007 | Golasky et al. | |
| 7,502,803 B2 * | 3/2009 | Culter et al. | 1/1 |
| 7,668,945 B2 * | 2/2010 | Doran et al. | 709/222 |
| 7,730,205 B2 * | 6/2010 | Rothman et al. | 709/238 |
| 7,886,190 B2 * | 2/2011 | Rothman et al. | 714/36 |
| 2008/0059491 A1 | 3/2008 | Gatti | |
| 2008/0153412 A1 | 6/2008 | Gatti | |
| 2008/0222190 A1 | 9/2008 | Kosaka | |
| 2008/0250398 A1 | 10/2008 | Takahashi et al. | |
| 2009/0172797 A1 * | 7/2009 | Yao et al. | 726/9 |
| 2009/0271600 A1 * | 10/2009 | Joshi et al. | 713/2 |
| 2009/0319763 A1 * | 12/2009 | Zimmer et al. | 713/1 |
| 2010/0017796 A1 * | 1/2010 | Walker et al. | 717/174 |

\* cited by examiner

Primary Examiner — Cheng-Yuan Tseng
(74) Attorney, Agent, or Firm — Larson Newman, LLP

(57) ABSTRACT

A method can include, during a boot flow at an information handling system, receiving an initial device path related to a device that is integrated with or coupled to the information handling system. The method can also include identifying a system-specific device location table based on a node included in the initial device path and receiving a particular alternate location string associated with the node at the system-specific location table. Further, the method can include adding the particular alternate location string to an alternate device path string related to the device and outputting the alternate device path to a user after the alternate device path includes an alternate location string associated with each node of the initial device path.

18 Claims, 3 Drawing Sheets

SYSTEM AND METHOD OF PROVIDING A USER-FRIENDLY DEVICE PATH

FIELD OF THE DISCLOSURE

This disclosure relates generally to methods and code used by information handling systems, and more particularly to systems and methods to provide a user-friendly device path.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of particular embodiments. Embodiments incorporating teachings of the present disclosure are illustrated and described with respect to the drawings presented herein.

The use of the same reference symbols in different figures indicates similar or identical items.

DETAILED DESCRIPTION

Figure 1:
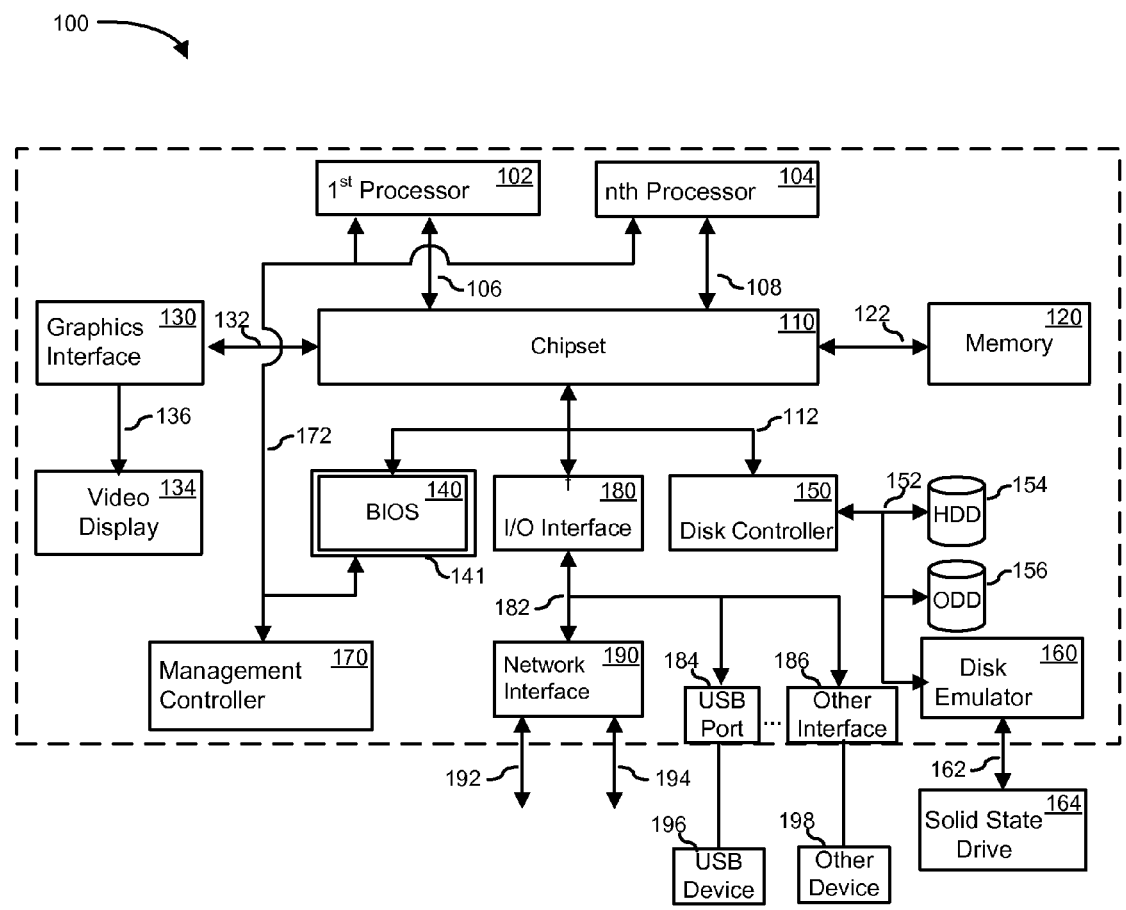
FIG. 1 includes a functional block diagram of an information handling system including a basic input/output system and a main circuit board control module.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price.

The information handling system can include memory (volatile such as random access memory, nonvolatile, such as read only memory or flash memory, or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (such as actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106 and the $n^{th}$ processor 104 can be coupled to the chipset 110 via the host bus 108.

The chipset 110 can support the processors 102 through 104, allowing for simultaneous processing by the processors 102 through 104, and can support the exchange of information within the information handling system 100 during multiple processing operations. In an aspect, the chipset 110 can function to provide access to the processor 102 using host bus 106, and the $n^{th}$ processor 104 using the host bus 108. In another aspect, the chipset 110 can include a dedicated bus (not illustrated) to transfer data between the processor 102 and the $n^{th}$ processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus (not illustrated). The chipset 110 can also provide bus control and can handle transfers between the host buses 106 through 108, and the memory bus 122. In accordance with another aspect (not illustrated), the information handling system can include a separate memory dedicated to each processor 102 through 104. Each memory can include a memory bus coupled between each processor 102 through 104 and its dedicated memory. In accordance with yet another aspect, the chipset 110 can be generally considered an application specific chipset that provides connectivity to various buses, and integrates other system functions. For example, the chipset 110 can be provided using a chipset that includes two parts: a Graphics and Memory Controller Hub (GMCH) and an I/O Controller Hub (ICH). The chipset 110 can also be packaged as an ASIC.

The information handling system 100 can also include a graphics interface 130 that can be coupled to the chipset 110 using a graphics bus 132. The graphics interface 130 can provide a video display output 136 to a video display 134. In one form, the graphics interface 130 can be an Accelerated Graphics Port (AGP) interface to display content within the video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O channel 112 connected to the chipset 110. The I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. In one embodiment, a PCI bus can be operated at approximately 66 MHz, a PCI-X bus can be operated at approximately 133 MHz, and a PCIe link can be operated at approximately 250 million bytes per second (MB/s) per lane in each direction. PCI buses, PCI-X buses, and PCIe links can be provided to comply with industry standards for connecting and communicating between various PCI, PCI-X and PCIe enabled hardware devices, respectively. The chipset 110 can include other buses in association with, or independent of, the I/O channel 112, including other industry standard buses (such as Industry Standard Architecture (ISA), Small Computer Serial Interface (SCSI), Inter-Integrated Circuit (I²C), System Packet Interface (SPI), or Universal Serial Bus (USB), proprietary buses) or any combination thereof.

In an alternate embodiment, the chipset 110 can be a chipset employing a Northbridge/Southbridge chipset configuration (not illustrated). For example, a Northbridge portion of the chipset 110 can communicate with the processors 102 through 104 using the host buses 106 through 108, and can control interaction with the memory 120, the I/O channel 112, and activities for the video graphics interface 130. The chipset 110 can also include a Southbridge portion (not illustrated) of the chipset 110, and can handle I/O functions of the chipset 110. The Southbridge portion can manage basic forms of I/O, such as USB, serial I/O, audio outputs, Integrated Drive Electronics (IDE), ISA I/O, or any combination thereof for the information handling system 100.

The information handling system 100 can also include a basic input/output system (BIOS) module 140 that can be coupled to the I/O channel 112. The BIOS module 140 can include BIOS code operable to detect and identify resources within the information handling system 100, provide the appropriate drivers for those resources, initialize those resources, and access those resources. The BIOS module 140 can be operable during a boot sequence and provide information needed to properly boot the information handling system 100 before, during, and after an operating system for the information handling system 100 is launched. In a particular embodiment, the BIOS module 140 can be included in a persistent memory 141, such as a FLASH memory device, a non-volatile random access memory (NVRAM) device, a complementary metal-oxide semiconductor (CMOS) memory device, another persistent memory device or any combination thereof.

The information handling system 100 can further include a disk controller 150 coupled to the I/O channel 112. The disk controller 150 can include a disk interface 152 that can include other industry standard buses (such as Integrated Drive Electronics (IDE), Parallel Advanced Technology Attachment (PATA), Serial Advanced Technology Attachment (SATA), SCSI, or USB or proprietary buses), or any combination thereof. The disk controller 150 can be coupled to one or more disk drives via the disk interface 152. Such disk drives include a hard disk drive (HDD) 154 or an optical disk drive (ODD) 156 (such as a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 166 can read a removable data storage medium such as a Compact Disk (CD), a Digital Video Disk (DVD), a mini Digital Video Disk (mini-DVD), or other optical media. Additionally, the information handling system 100 can include a disk emulator 160 that is coupled to the disk interface 152. The disk emulator 160 can permit a solid-state drive 164 to be coupled to the information handling system 100 via an external interface 162. The external interface 162 can include other industry standard busses such as USB or IEEE 1394 (Firewire) or proprietary busses, or any combination thereof. Alternatively, the solid-state drive 164 can be disposed within the information handling system 100.

The information handling system 100 can further include a management controller 170 that can be coupled to the chipset 110 via a system communication bus 172, such as a control bus. The management controller 170 may be on a main circuit board (such as a baseboard, a motherboard, or any combination thereof), integrated onto another component such as the chipset 110, in another suitable location, or any combination thereof. Although not illustrated, another resource, such as the processors 102 or 104, the memory 120, the graphics interface 130, the video display 134, the I/O interface 140, or the disk controller 150, or any combination thereof, can be coupled to the management controller 170. Commands, communications, or other signals may be sent to or received from the management controller 170 by any one or any combination of resources previously described. The management controller 170 can be part of an integrated circuit or a chip set within the information handling system 100.

The information handling system 100 can also include an I/O interface 180 that can be connected to the chipset 110 via the I/O channel 112. The I/O interface 180 can be coupled to a peripheral channel 182 that can be of the same industry standard or proprietary bus or link architecture as the I/O channel 112, or of a different industry standard or proprietary bus or link architecture than the I/O channel 112. As such, the I/O interface 180 can extend the I/O channel 112 capacity when the peripheral channel 182 is the same as the I/O channel 112, or translate information from a type suitable to the industry standard or proprietary bus or link architecture of the I/O channel 112 to a type suitable to a different industry standard or proprietary bus or link architecture, and vice versa, when the peripheral channel 182 is different than the I/O channel 182. Other I/O interfaces (not illustrated) may also be used in addition to the I/O interface 180, if needed or desired.

The peripheral channel 182 can include a bus structure that allows the installation and coupling of additional resources to the information handling system via interfaces 184 through 186, such as a universal serial bus (USB) port 184 and another interface 186, such as a PCI interface, an external serial ATA port, an SCSI port, a serial port, a parallel port, or another type of port. The ports 184 through 186 can be coupled to a main circuit board, on separate circuit boards or add-in cards disposed within the information handling system 100, to devices 196 through 198 that are external to the information handling system 100, or any combination thereof.

The information handling system 100 can also include a network interface device 190 that is coupled to the I/O interface 180 via the peripheral channel 182. The network interface device 190 may be a network interface card (NIC) disposed within the information handling system 100, on a main circuit board (such as a baseboard, a motherboard, or any combination thereof), integrated onto another component such as the chipset 110, in another suitable location, or any combination thereof. The network interface device 190 can include a network channel 192 and a network channel 194. The network interface device 190 can also include additional network channels (not illustrated).

In accordance with an aspect, the network channels 192 and 194 can be of a different industry standard or proprietary bus or link architecture than the peripheral channel 182, and the network interface device 190 can translate information from a type suitable to the industry standard or proprietary bus or link architecture of the peripheral channel 182 to a type suitable to the industry standard or proprietary bus or link architecture of the network channels 192 and 194, and vice versa. The network channels 192 and 194 can be of industry standard architecture (such as InfiniBand, Fibre Channel, or Gb Ethernet), proprietary channel architecture, or any combination thereof. Other network interface devices (not illustrated) may also be used in addition to the network interface device 190, if needed or desired. The network channels 192 and 194 can be coupled to network resources (not illustrated). The network resource can include another information handling system, a data storage system, another network, a grid management system, another suitable resource or any combination thereof.

In a particular illustrative embodiment, a boot event can occur at the information handling system, such as a power on event, a restart event, or another boot event. The BIOS module 140 can be adapted to start executing a boot flow after the boot event but before the chipset 110 and memory 120 begin operating. In one embodiment, the BIOS module 140 can be adapted to execute a boot service, such as a UEFI protocol or application programming interface (API) to perform functions related to providing a user-friendly device path. The BIOS module 140 can receive an initial device path related to a device that is integrated with or external to the information handling system, such as a standard UEFI device path related to a PCI-compatible device, a USB-compatible device, an eSATA-compatible device, a serial port-compatible device, a parallel port-compatible device, an SCSI-compatible device, another device, or any combination thereof.

The BIOS module 140 can be adapted to unpack the initial device path and examine a node included in the initial device path. The BIOS module 140 can be adapted to determine a node type corresponding to the node, such as a PCI node, a USB node, an eSATA node, a network interface node, or another node type. The BIOS module 140 can be adapted to identify a system-specific device location table associated with the node type. In one example, the BIOS module 140 can be adapted to match a node's function number, device number, bus number, other indicia, or any combination thereof, to a system-specific device location table. For instance, if the device is a PCI-compatible device, the BIOS module 140 can be adapted to match a PFA of the node to a system-specific device location table.

The BIOS module 140 can be adapted to store the system-specific device location table. For instance, the BIOS module 140 can store a system-specific device location table of built-in devices, ports, slots or any combination thereof, each with its system-specific device path and an alternate location string, such as a user-friendly location string. In another embodiment, the BIOS module 140 can be adapted to store a plurality of system-specific device location tables, where a system-specific device location table can be associated with a particular node type.

The BIOS module 140 can be adapted to receive, from the system-specific device location table, an alternate location string associated with the examined node. In one example, the BIOS module 140 can be adapted to retrieve the alternate location string via a function call. The alternate location string can include a user-friendly string, such as a plain language string or other user-friendly string describing the node. The BIOS module 140 can be adapted to add the alternate location string to an alternate device path.

The BIOS module 140 can be adapted to determine whether the initial device path includes another node and to receive an alternate location string for each node in the initial device path. Additionally, the BIOS module 140 can be adapted to receive a device name string related to the device associated with the initial device path. The device name string can include a user-friendly device name string, such as a vendor string or a plain language device name string describing the device. In an embodiment, the BIOS module 140 can be adapted to receive the device name string from a system-specific device location table. In another embodiment, the BIOS module 140 can be adapted to receive the device name string from a UEFI driver associated with the device or from a device option read only memory (ROM). The BIOS module 140 can be adapted to add the device name string to the alternate device path.

After an alternate location string is received for each node in the initial device path, in a particular embodiment, the BIOS module 140 can be adapted to return the alternate device path. The alternate device path provides information to a user to identify the device type and the physical location of the device. For example, a USB key coupled to a USB port on a front portion of the information handling system can be represented by a UEFI device path:
[Acpi(PNP0A08,0x0)/Pci(0x1D,0x7)/USB(0x6,0x0)/USB (0x0,0x0)/HD(1,MBR,0x00000 000,0x3F,0x1EA7AD]
and the alternate device path can include:
"Front USB: TD Classic 003b."

In another example, a device path for an embedded network card can be:
[Acpi(PNP0A08,0x0)/Pci(0x1C,0x0)/Pci(0x0,0x0)/Pci(0x0, 0x0)/MAC(019B9CDF5AD,0x0)]
and the alternate device path can include:
"Embedded NIC 1: Broadcom NetXtreme II gigabit Ethernet (BMC5709)."

In one embodiment, the BIOS module 140 can be adapted to copy the alternate device path to an allocated buffer at the information handling system. For instance, the buffer can be located at NVRAM or system RAM. In another embodiment, the BIOS module 140 can be adapted to return a pointer corresponding to the initial device path so it can be converted to additional detailed text related to the device. The pointer can be stored in system memory and points to the memory location of the allocated buffer.

Figure 2:
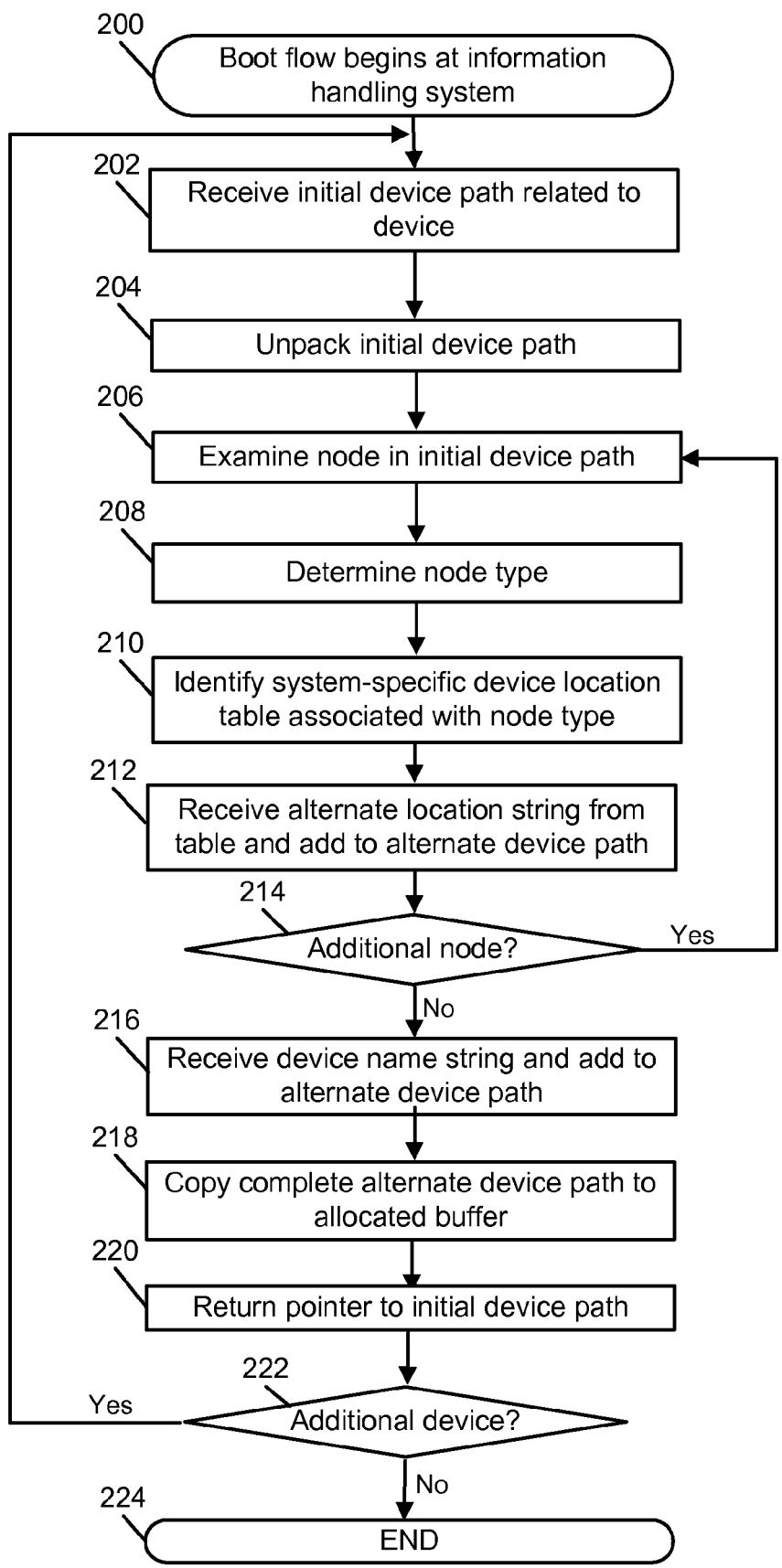
FIG. 2 includes a flow diagram illustrating a particular embodiment of a method of providing a user-friendly device path.

FIG. 2 illustrates a particular embodiment of a method of providing a user-friendly device path. At 200, a boot flow begins at an information handling system. Moving to block 202, a boot service, such as a UEFI protocol or API, receives an initial device path related to a device, such as a standard UEFI device path related to a device coupled to a PCI bus or other port or interface at the information handling system. Proceeding to block 204, the boot service unpacks the initial device path and, at block 206, examines a node included in the initial device path.

Continuing to block 208, the boot service determines a node type corresponding to the node, such as a PCI node, a USB node, an eSATA node, a network interface node, or another node type. Advancing to block 210, the boot service identifies a system-specific device location table associated with the node type. At block 212, the boot service receives, from the system-specific device location table, an alternate location string associated with the node examined at block 206. The alternate location string can include a user-friendly string, such as a plain language string describing the node. The boot service adds the alternate location string to an alternate device path.

Moving to decision node 214, the boot service determines whether the initial device path includes another node. If so, the method returns to block 206. Otherwise, the method proceeds to block 216, and the boot service receives a device name string related to the device associated with the initial device path. The device name string can also include a user-friendly device name string, such as a plain language device name string describing the device. The boot service adds the device name string to the alternate device path. Continuing to block 218, after an alternate location string is received for each node in the initial device path, in a particular embodiment, the boot service can copy the alternate device path to an allocated buffer at the information handling system. Advancing to block 220, in an illustrative embodiment, the boot service can return a pointer corresponding to the initial device path.

At decision node 222, the boot service can determine whether there is another device for which an alternate device path is to be returned. If so, the method returns to block 202. The method terminates at 224.

Figure 3:
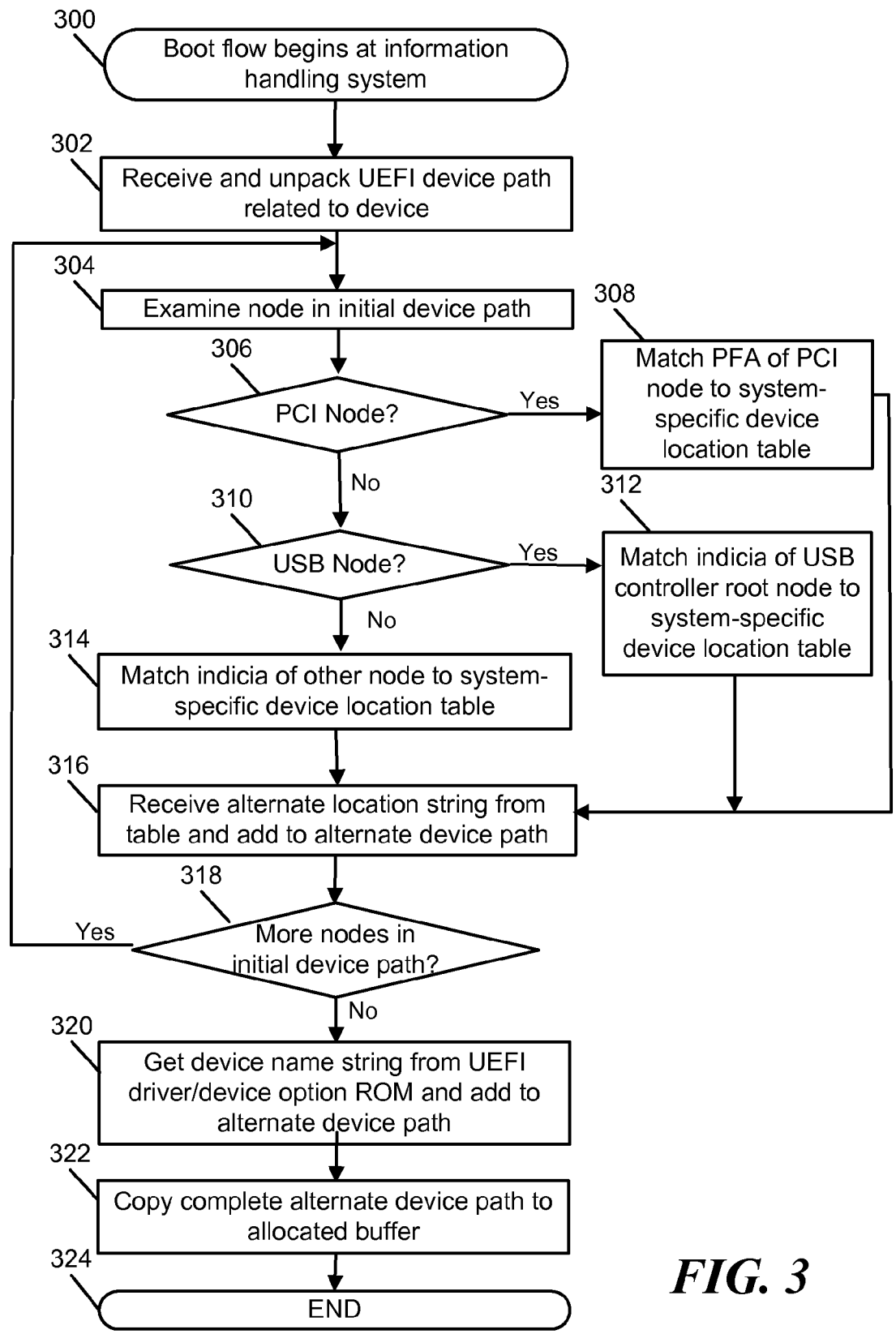
FIG. 3 includes a flow diagram illustrating a particular embodiment of a method of providing a user-friendly device path.

FIG. 3 includes a flow diagram illustrating a particular embodiment of a method of providing a user-friendly device path. At 300, a boot flow begins at an information handling system. Moving to block 302, a boot service, such as a UEFI protocol or API, receives and unpacks a UEFI device path related to a device. Proceeding to block 304, the boot service examines a node included in the initial device path.

Continuing to decision node 306, the boot service determines whether the node corresponds to a PCI node. If so, the method advances to block 308, and the boot service matches a PFA of the PCI node to a system-specific device location table. The method then moves to block 316, and the boot service receives, from the system-specific device location table, an alternate location string associated with the node examined at block 304. The alternate location string can include a user-friendly string, such as a plain language string describing the node. The boot service adds the alternate location string to an alternate device path.

Returning to decision node 306, if the boot service determines that the node does not correspond to a PCI node, the method moves to decision node 310, and the boot service determines whether the node corresponds to a USB node, such as a USB port or bus. If so, the method advances to block 312, and the boot service matches a function number, device number, bus number, other indicia, or any combination thereof, of the USB node to a system-specific device location table. The method then moves to block 316, and the boot service receives, from the system-specific device location table, an alternate location string associated with the node examined at block 304.

Returning to decision node 306, if the boot service determines that the node does not correspond to a PCI or USB node, the method moves to decision node 314, and the boot service matches a function number, device number, bus number, other indicia, or any combination thereof, of another type of node to a system-specific device location table. The method then proceeds to block 316, and the boot service receives, from the system-specific device location table, an alternate location string associated with the node examined at block 304.

At decision node 318, the boot service determines whether the initial device path includes another node. If so, the method returns to block 304. Otherwise, the method proceeds to block 320, and the boot service receives a device name string related to the device associated with the initial device path. The device name string can also include a user-friendly device name string, such as a plain language device name string describing the device. The boot service adds the device name string to the alternate device path. Continuing to block 322, after an alternate location string is received for each node in the initial device path, in a particular embodiment, the boot service can copy the alternate device path to an allocated buffer at the information handling system. The method terminates at 324.

After reading this specification, skilled artisans will appreciate the usefulness and flexibility of the method and system described herein. Configuration information can be exported from an information handling system and imported into the same or different information handling system before an operating system is launch or before a full function version of the operating system is launched. The configuration information can be edited before importation. Thus, the configuration information may be edited for different types or configurations of information handling systems before that particular configuration information is used. The information handling system may ignore or otherwise not use the imported configuration information to the extent such configuration information is not relevant to the particular information handling system. If the imported configuration information does not include a particular piece of configuration information, the information handling system may use a default value that already is present within the information handling system. Thus, the method and system are flexible in that they can be used for many different information handling system, for instances in which the imported configuration information does not have a corresponding component, and can be used when the information handling system includes a component in which the imported configuration information does not have a corresponding variable-value pair.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a method can include, during a boot flow at an information handling system, receiving an initial device path related to a device that is integrated with or coupled to the information handling system. The method can also include identifying a system-specific device location table based on a node included in the initial device path and receiving a particular alternate location string associated with the node at the system-specific location table. Further, the method can include adding the particular alternate location string to an alternate device path string related to the device and outputting the alternate device path to a user after the alternate device path includes an alternate location string associated with each node of the initial device path.

In an embodiment of the first aspect, the particular alternate location string includes a user-friendly location string. For instance, the particular alternate location string includes a plain language location string.

In another embodiment of the first aspect, the method can include receiving a device string identifying the device from the system-specific location table, adding the device string to the alternate device path string, and outputting the alternate device path to a user after the alternate device path includes the device string and an alternate location string associated with each node of the initial device path.

In another embodiment of the first aspect, the method can include receiving a device string identifying the device from a UEFI driver associated with the device, adding the device string to the alternate device path string, and outputting the alternate device path to a user after the alternate device path includes the device string and an alternate location string associated with each node of the initial device path.

In another embodiment of the first aspect, the method can include receiving a device string identifying the device from a device option read only memory (ROM) associated with the device, adding the device string to the alternate device path string, and outputting the alternate device path to a user after the alternate device path includes the device string and an alternate location string associated with each node of the initial device path.

In another embodiment of the first aspect, the method can include copying the alternate device path to an allocated buffer associated with the device.

In another embodiment of the first aspect, the method can include returning a pointer associated with the initial device path.

In another embodiment of the first aspect, the method can include parsing the initial device path into a plurality of nodes before identifying a system-specific device location table based on a node included in the initial device path.

In another embodiment of the first aspect, the initial device path can include a unified extensible firmware interface (UEFI) device path.

According to a second aspect, a system can include an information handling system that can be adapted to, during a boot flow, receive an initial device path related to a device that is integrated with or coupled to the information handling system; to identify a system-specific device location table based on a node included in the initial device path; to receive a particular alternate location string associated with the node at the system-specific location table, where the particular alternate location string can include a user-friendly location string; to add the particular alternate location string to an alternate device path string related to the device; and to output the alternate device path to a user after the alternate device path includes an alternate location string associated with each node of the initial device path.

In an embodiment of the second aspect, the information handling system can be adapted to execute a UEFI boot service during the boot flow. In another embodiment of the second aspect, the device can include a PCI-compatible device, a USB-compatible device, an eSATA-compatible device, a serial port-compatible device, a parallel port-compatible device, an SCSI-compatible device, or any combination thereof.

In another embodiment of the second aspect, the alternate device path can include a device name and a physical location of the device. In another embodiment of the second aspect, the physical location can include a port at the information handling system. In another embodiment of the second aspect, the system-specific device location table can be included in firmware stored at the information handling system.

According to a third aspect, a computer-readable medium can include processor-readable instructions that are executable by a processor to perform a method. The method can include, during a boot flow at the information handling system, receiving an initial device path related to a device that is integrated with or coupled to the information handling system, identifying a system-specific device location table based on a node included in the initial device path, receiving a particular alternate location string associated with the node at the system-specific location table, where the particular alternate location string can include a user-friendly location string, adding the particular alternate location string to an alternate device path string related to the device, and outputting the alternate device path to a user after the alternate device path includes an alternate location string associated with each node of the initial device path.

In an embodiment of the third aspect, the system-specific device location table can be identified based on a bus number, a device number, a function number or any combination thereof.

In another embodiment of the third aspect, the processor-readable instructions include an application programming interface of a UEFI-defined protocol.

In another embodiment of the third aspect, the method can include receiving a plurality of alternate device path strings from a plurality of system-specific device location tables.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   during a boot flow at an information handling system:
   receiving an initial device path related to a device that is integrated with or coupled to the information handling system, wherein the initial device path comprises a unified extensible firmware interface (UEFI) device path;
   identifying a system-specific device location table based on a node included in the initial device path;
   receiving a particular alternate location string associated with the node at the system-specific device location table;
   adding the particular alternate location string to an alternate device path string related to the device; and
   outputting the alternate device path to a user after the alternated device path includes an alternate location string associated with each node of the initial device path.

2. The method of claim 1, wherein the particular alternate location string includes a user-friendly location string.

3. The method of claim 2, wherein the particular alternate location string includes a plain language location string.

4. The method of claim 1, further comprising:
receiving a device string identifying the device from the system-specific device location table;
adding the device string to the alternate device path string; and
outputting the alternate device path to a user after the alternate device path includes the device string and an alternate location string associated with each node of the initial device path.

5. The method of claim 1, further comprising:
receiving a device string identifying the device from a UEFI driver associated with the device;
adding the device string to the alternate device path string; and
outputting the alternate device path to a user after the alternate device path includes the device string and an alternate location string associated with each node of the initial device path.

6. The method of claim 1, further comprising:
receiving a device string identifying the device from a device option read only memory (ROM) associated with the device;
adding the device string to the alternate device path string; and
outputting the alternate device path to a user after the alternate device path includes the device string and an alternate location string associated with each node of the initial device path.

7. The method of claim 1, further comprising copying the alternate device path to an allocated buffer associated with the device.

8. The method of claim 1, further comprising returning a pointer associated with the initial device path.

9. The method of claim 1, further comprising parsing the initial device path into a plurality of nodes before identifying a system-specific device location table based on a node included in the initial device path.

10. A system, comprising:
an information handling system adapted to execute a unified extensible firmware interface (UEFI) boot service during a boot flow, wherein: during the boot flow:
receiving an initial device path related to a device that is integrated with or coupled to the information handling system;
identify a system-specific device location table based on a node included in the initial device path;
receive a particular alternate location string associated with the node at the system-specific device location table, wherein the particular alternate location string includes a user-friendly location string;
add the particular alternate location string to an alternate device path string related to the device; and
output the alternate device path to a user after the alternate device path includes an alternate location string associated with each node of the initial device path.

11. The system of claim 10, wherein the device includes a PCI-compatible device, a USB-compatible device, an eSATA-compatible device, a serial port-compatible device, a parallel port-compatible device, an SCSI-compatible device, or any combination thereof.

12. The system of claim 10, wherein the alternate device path includes a device name and a physical location of the device.

13. The system of claim 12, wherein the physical location comprises a port at the information handling system.

14. The system of claim 10, wherein the system-specific device location table is included in firmware stored at the information handling system.

15. A non-transitory computer-readable medium including processor-readable instructions that are executable by a processor to perform a method, the method comprising:
during a boot flow at the information handling system:
receiving an initial device path related to a device that is integrated with or coupled to the information handling system, wherein the initial device path comprises a unified extensible firmware interface (UEFI) device path;
identifying a system-specific device location table based on a node included in the initial device path;
receiving a particular alternate location string associated with the node at the system-specific device location table, wherein the particular alternate location string includes a user-friendly location string;
adding the particular alternate location string to an alternate device path string related to the device; and
outputting the alternate device path to a user after the alternate device path includes an alternate location string associated with each node of the initial device path.

16. The non-transitory computer-readable medium of claim 15, wherein the system-specific device location table is identified based on a bus number, a device number, a function number or any combination thereof.

17. The non-transitory computer-readable medium of claim 15, wherein the processor-readable instructions include an application programming interface of a UEFI-defined protocol.

18. The non-transitory computer-readable medium of claim 15, wherein the method further comprises receiving a plurality of alternate device path strings from a plurality of system-specific device location tables.

* * * * *